UNITED STATES PATENT OFFICE.

WILLIAM D. HALL, OF HAMDEN, CONNECTICUT.

IMPROVEMENT IN FISH-OILS.

Specification forming part of Letters Patent No. 29,164, dated July 17, 1860.

*To all whom it may concern:*

Be it known that I, WILLIAM D. HALL, of the town of Hamden, in the county of New Haven and State of Connecticut, have invented a new and useful Improvement in Extracting Oil from Fish; and I do hereby declare that the following is a full, clear, and exact description of the process, &c., by which I extract it.

My improvement consists in the simple process of boiling the fish in water until the sounds or air-bladders have burst or been dissolved, so as to allow the air to escape, when the residuum or solid portion of the fish will sink to the bottom, while the oil, in a clarified state, will float upon the top of the water, entirely separated by a stratum of water from all of the solid substances, when the oil may be dipped or drawn off in any convenient way, and will be ready for use or to be put up for market.

I boil the fish in any convenient vessel and by any convenient heat; but when the manufacture is sufficient to warrant it, as will generally be the case, I prefer large wooden tubs or tanks to contain the water and fish and to use the heat of steam for boiling.

I take fresh or recently-caught fish and put them into the vessel while the water is at any temperature, from cold to boiling, being careful to have water enough to cover the fish and stand a few inches above them when they sink, and apply or continue the heat and keep the water boiling until the solid parts of the fish have subsided or sunk to the bottom of the vessel, which will be some four to six hours. This subsidence will not take place until the sounds have been dissolved, and by that time the cellular tissue will have become so thoroughly disintegrated that the oil will have been liberated, and will be floating on the surface with a stratum of a few inches of water between the oil and the solid residuum of the fish.

Boiling the fish until they sink is absolutely necessary to separate them or their solid residuum from the oil, which floats on the surface of the water; and it is equally necessary that there should be a stratum of water between the oil and the solid residuum of the fish at the conclusion of the boiling, to form a perfect separation of the two substances, and boiling after the solid portions have sunk will, in general, if not always, be found useless, as, in general, all the oil will be extracted before the solid parts subside, as the cellular tissue, being near the skin, will be disintegrated before the sounds will burst.

The advantages of my improved method over all previous modes of extracting oil from fish consist, in part, in the simplicity of the process, it being no more than boiling the fish till they sink, when the oil, which is sufficiently clarified by boiling in the water while boiling the fish for ordinary use, as for lights, lubrication, &c., will be ready for use or to be put up for market, while that by the former method, of partially boiling in water or cooking by steam, &c., without water, and then separating the oil from the solid portion of the fish by pressure, subjects the manufacturer to the additional expense of a press, as well as the working of it; and then other substances are pressed out with the oil, so that the oil is not fit for market until it has been clarified, which is another additional expense; and the residuum or pomace is in mine much more readily available for manure, as it needs no grinding, which is always necessary with the pressed fish-cake; and in that my process is inoffensive, and the oil more valuable than that by the putrefying process, which also requires the fish to be partially boiled, as in that the manufacture becomes an intolerable nuisance for miles around, for which reason it has been abandoned for my process by all who have become acquainted with mine; and the oil extracted by my process sells in the market for at least fifty per cent. more than that made by the putrefying process, as that oil contains so much fetor that it is really only fit for outdoor use, and the residuum can only be used for manure immediately after the oil has been extracted, and in the immediate vicinity, as its fetor forbids its transportation.

I am aware that the oil has been extracted from the fish by partially boiling them in water, but that, while floating in the water and mixed with the oil, they have been, with the oil, transferred to a common press or passed through rollers, to separate the oil from the solid portion of the fish, or the solid portion has been freed from the liquid by straining, as in Pettitt's English Patent, No. 84, 1852; and that the fish have been cooked, or partially cooked, by steam or by baking, &c., and then subjected to pressure to separate the oil from the solid portion; and that the oil has been obtained, in a very bad state, by partially boiling the fish and then using the putrefying process to complete the separation of the oil. I therefore do not claim either of these methods as my invention; but

What I claim as my invention, and desire to secure by Letters Patent, is—

As an article of manufacture, an oil extracted from fish in the manner set forth.

WM. D. HALL.

Witnesses:
SAML. NOYES,
R. FITZGERALD.